April 2, 1940. A. B. CONANT 2,195,981
WATER PURIFYING APPARATUS
Filed Oct. 25, 1937
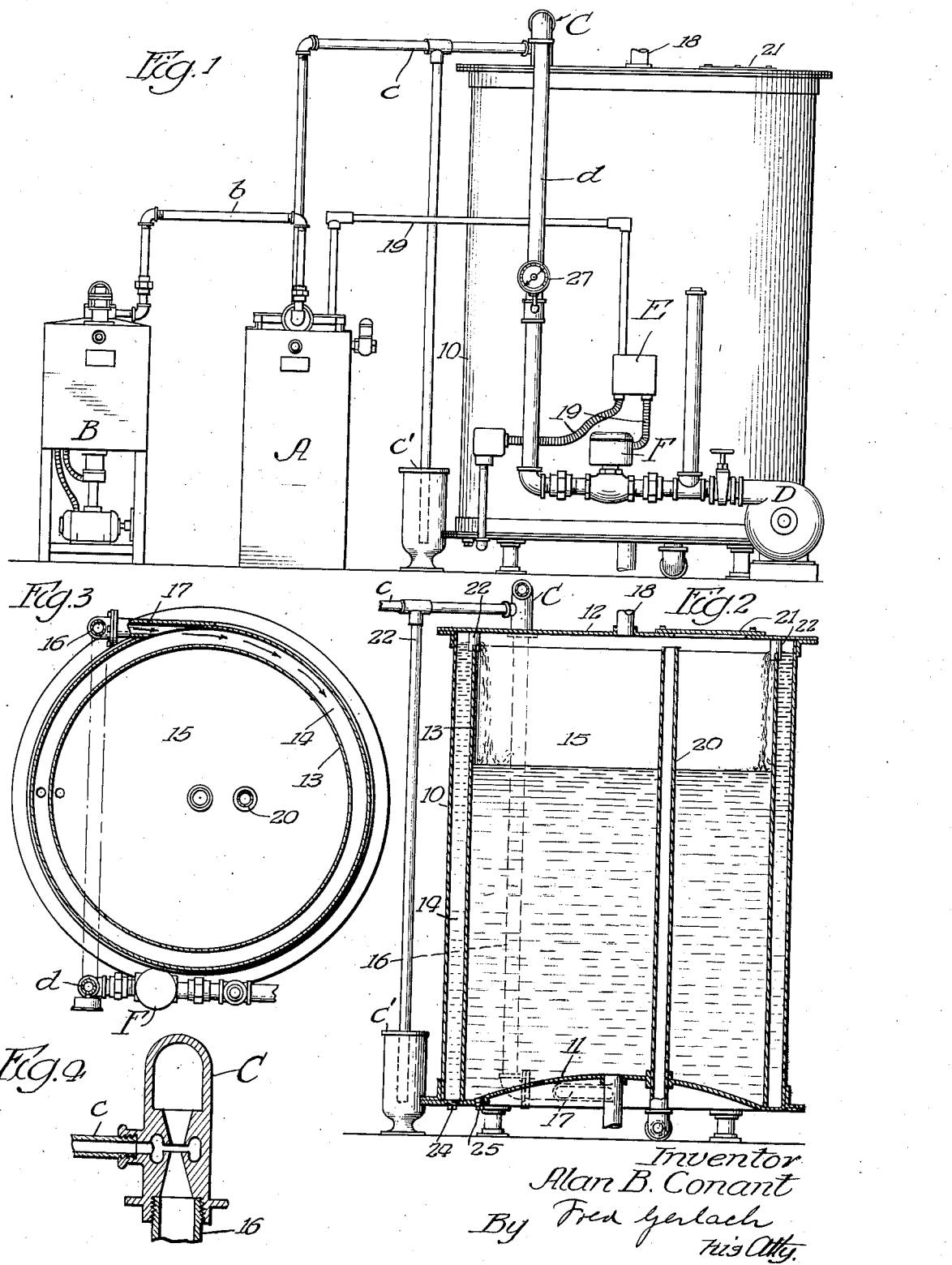
Inventor
Alan B. Conant
By Fred Gerlach
His Atty.

Patented Apr. 2, 1940

2,195,981

UNITED STATES PATENT OFFICE 2,195,981

WATER PURIFYING APPARATUS

Alan B. Conant, San Francisco, Calif., assignor to Montgomery Brothers, San Francisco, Calif., a copartnership composed of F. H. Montgomery and W. R. Montgomery Application October 25, 1937, Serial No. 170,801

2 Claims. (Cl. 210—27)

The invention relates to apparatus for ozonizing water.

The object of the invention is to provide an improved apparatus in which a mixture or emulsion of water and ozone will be caused to travel tangentially around and upwardly in an annular chamber, to effect a thorough mixing of the ozone and water, and by which the excess or spent ozone will be released, and the treated water will be stored for use.

Another object of the invention is to provide an improved apparatus of this character in which the mixing of the ozone and water is effected in an annular chamber and overflows into a storage reservoir inside of the chamber for maintaining a constantly available supply of treated water for use, so that a single tank will serve both as a mixing and storage reservoir for the treated water.

Other objects of the invention will appear from the detail description.

The invention consists in the several novel features which are hereinafter set forth and are more particularly defined by claims at the conclusion hereof.

In the drawing: Fig. 1 is a side elevation of apparatus embodying the invention. Fig. 2 is a vertical section of the combined mixing column and storage reservoir. Fig. 3 is a section on line 3—3 of Fig. 2. Fig. 4 is a section of the injector.

The invention is exemplified in apparatus comprising an ozone generator A; a dehydrator B for drying the air supplied to the ozone generator; a pipe b for delivering air from the dehydrator to the generator; an injector C connected to receive ozone from the generator A through pipe c; a pump D for delivering water under pressure through pipe d to the injector C; and a combined mixing column and storage reservoir which receives mixed water and ozone from the injector C.

The combined mixing column and injector comprises a tank provided with an annular cylindrical wall 10, a bottom 11 and a top 12 secured together to form a substantially closed tank, and a cylindrical wall 13 united at its lower end to the bottom 11 of the tank and terminating a short distance below the top 12. Wall 13 is spaced from wall 10 to form an annular chamber, comparatively narrow in cross-section between walls 13 and 14. Wall 13 also forms, within itself, a reservoir 15 of sufficient capacity to maintain a predetermined column of ozonized water which is sufficient to supply the demanded use. A pipe 16 is connected to the outlet of the injector to conduct the mixture of ozone and water or emulsion to the bottom of the annular chamber 14 and deliver it through a branch pipe 17 tangentially into the lower portion of the mixing chamber. The annular wall 13 terminates below the top 12 of the tank to leave a space over its upper edge so that the mixture overflows from the top of the column in the annular chamber into the storage reservoir 15. The pump D delivers water at sufficient pressure, for example at least thirty pounds, to force the water through the pipe d upwardly and across the top of the tank into the top of the injector C. The pressure and flow of water injects ozone produced in the generator A in a proper ratio of ozone and water. The mixture or emulsion of water and ozone passes downwardly through pipe 16 and branch 17 and is delivered into the annular chamber 14 under sufficient pressure to set up a spiral action or flow which places in motion all of the column in the annular chamber 14 with sufficient back pressure to reduce the flow but with sufficient force to retain somewhat the spiral stream through the column. During this spiral flow through chamber 14 the water and ozone are thoroughly mixed and when the mixture reaches the top of wall 15 it overflows the wall or cascades across the top of the inner column into the storage reservoir 15. This releases the excess or spent ozone into the upper portion of the tank for escape to atmosphere through a pipe 18 connected to the top 12 of the tank. This flow of water in the annular chamber 14 effects an intimate mixture of the ozone and water and its delivery over the top of wall 13 separates the excess or spent ozone from the water flowing into and in the storage reservoir 15. A pressure indicator 27 is connected to pipe d so the pressure of the water to the mixing column can be observed.

A predetermined column of treated water is maintained in the reservoir 15 so that a supply will always be available for use, by means of an electric switch E which is connected to be operated by the height and pressure of the water in reservoir 15. This switch is suitably connected, as well understood in the art, to automatically control the operation of an electromagnetically controlled water valve F which controls the delivery of water by pump D to the injector C and by conductors in a conduit 19 to control the actuation of the generator A and the dehydrator. A water-seal c' is connected to the ozone delivery pipe c. An overflow pipe 20 is provided for the treated water in reservoir 15 to prevent any excess of treated water from accumulating in the reservoir in the event that the automatic control means for the water supply should fail to operate. The top 12 of the tank is provided with a manhole and cover 21 for access to the interior of the tank. The upper end of wall 13 is held in spaced relation from wall 10 of the tank by lugs 22 fixed to and depending from the top 12. Drain-plugs 24 and 25 are provided in the bottom 11 for the water in the chamber 14 and reservoir 15, respectively.

The invention exemplifies apparatus for ozonizing water in which the water and ozone are delivered tangentially into the lower end of an annular chamber through which the mixture flows spirally so that the ozone and water will be thoroughly mixed for a sufficient period for that purpose. The invention also exemplifies an apparatus of that character in which the mixing is effected in an annular chamber within which is formed a reservoir whereby an ample supply of treated water will be maintained to supply the demand.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In apparatus for treating water with ozone, the combination of a tank comprising a cylindrical outer side-wall, a bottom and a top, an injector outside of the tank, means for supplying water and ozone to the injector, an inner cylindrical wall extending upwardly from the bottom and spaced from and adjacent to the side-wall of the tank, and forming with the outer side-wall an annular mixing chamber between said inner and outer walls and forming a storage reservoir for the treated water centrally in the tank, said annular chamber being substantially unobstructed and narrow so the mixed ozone and water will swirl completely around and upwardly between the bottom of the tank and the top of said annular chamber, a conduit between the outlet of the injector and the outer side-wall of and adjacent the bottom of the tank arranged to deliver mixed water and ozone tangentially of and into the lower portion of the unobstructed annular chamber and force the mixed water and ozone to swirl around and upwardly from the bottom to the top of the annular chamber, and means for conducting water from the top of the annular chamber into the reservoir.

2. In apparatus for treating water with ozone, the combination of a tank comprising a cylindrical outer side-wall, a bottom and a top, an injector outside of the tank, means for supplying water and ozone to the injector, an inner cylindrical wall extending upwardly from the bottom and spaced from and adjacent to the side-wall of the tank, and forming with the outer side-wall an annular mixing chamber between said inner and outer walls and forming a central storage reservoir for the treated water centrally in the tank, said annular chamber being substantially unobstructed and narrow so the mixed ozone and water will swirl completely around and upwardly between the bottom of the tank and the top of said annular chamber, and a conduit between the outlet of the injector and the outer side-wall of and adjacent the bottom of the tank arranged to deliver mixed water and ozone tangentially of and into the lower portion of the unobstructed annular chamber and force the mixed water and ozone to swirl around and upwardly from the bottom to the top of the annular chamber, the inner cylindrical wall terminating below the top of the tank so the treated water will overflow inwardly from the annular chamber into the reservoir.

ALAN B. CONANT.